United States Patent
Russell, Jr.

[11] 3,909,033
[45] Sept. 30, 1975

[54] TRAILER HITCH
[76] Inventor: Wayne B. Russell, Jr., 3895 Lugo Ave., Lynwood, Calif. 90262
[22] Filed: May 17, 1974
[21] Appl. No.: 470,736

[52] U.S. Cl.................. 280/477; 403/141; 403/143
[51] Int. Cl.².......................................... B60D 1/16
[58] Field of Search .......... 280/477, 510, 511, 512, 280/513; 403/141, 143

[56] References Cited
UNITED STATES PATENTS

| | | | |
|---|---|---|---|
| 2,072,473 | 3/1937 | Baumberger.................. | 280/512 X |
| 2,120,415 | 6/1938 | Meyer............................. | 280/477 |
| 2,558,906 | 7/1951 | Leon............................... | 280/511 |

*Primary Examiner*—Leo Friaglia
*Assistant Examiner*—R. Schrecengost
*Attorney, Agent, or Firm*—Donald D. Mon

[57] ABSTRACT

There is disclosed a trailer hitch comprising a base plate to be mounted on either a towed vehicle or a towing vehicle and a ball member to be mounted on the other vehicle in a depending position. The base plate comprises an inclined ramp leading up to a recessed socket so that when the two vehicles are brought together in towing relationship the depending ball on the one vehicle rides up on the ramp of the base plate on the other vehicle and drops into the socket. A cover plate brought down over the ball can be fastened to the base plate to hold the ball in place. The cover plate may be permanently placed over the ball member or alternatively hinged to the cover member.

3 Claims, 10 Drawing Figures

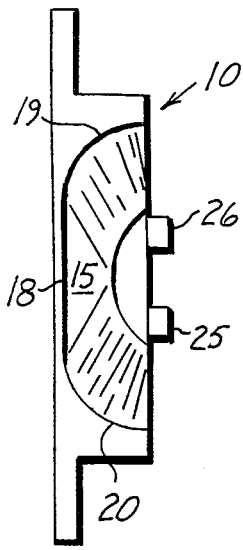
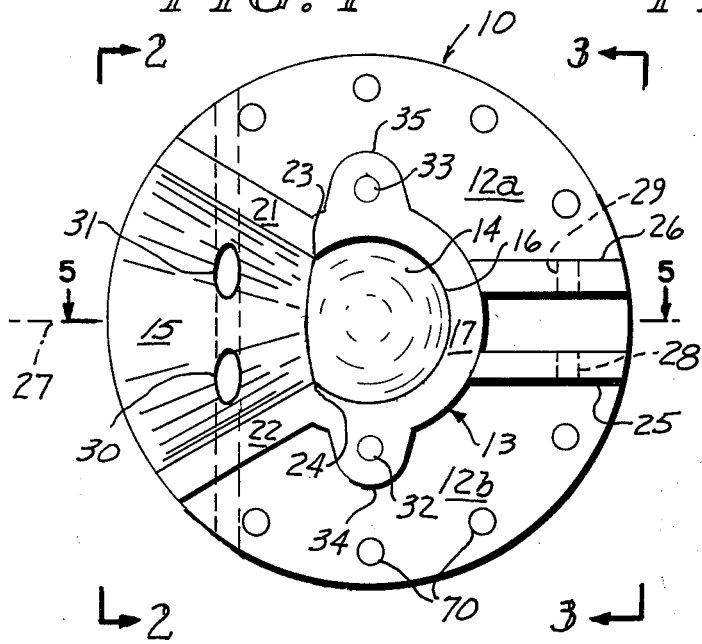
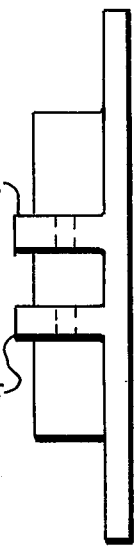
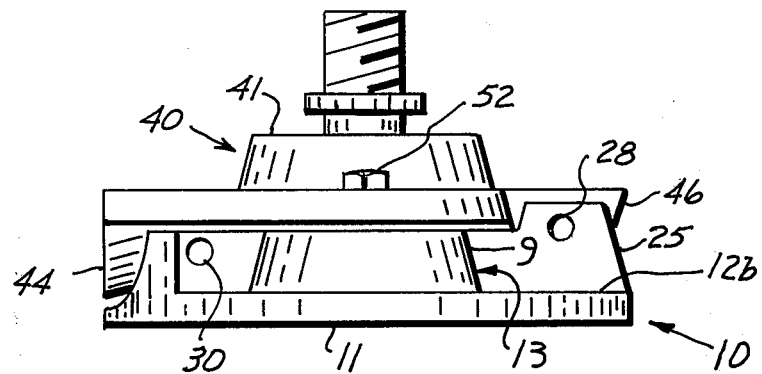
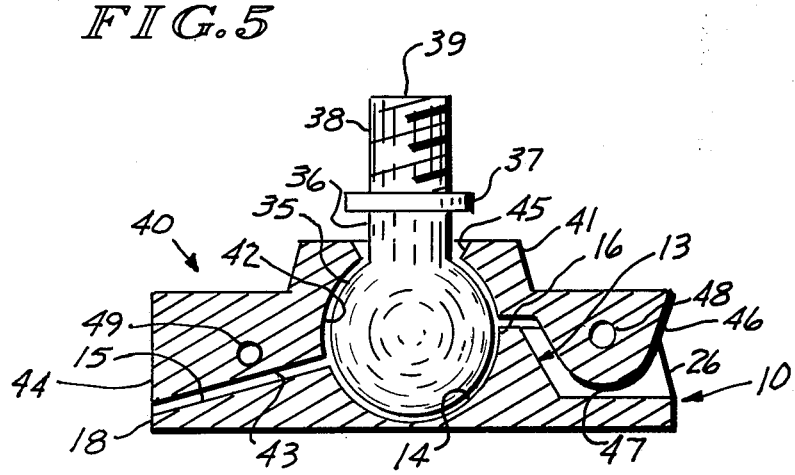

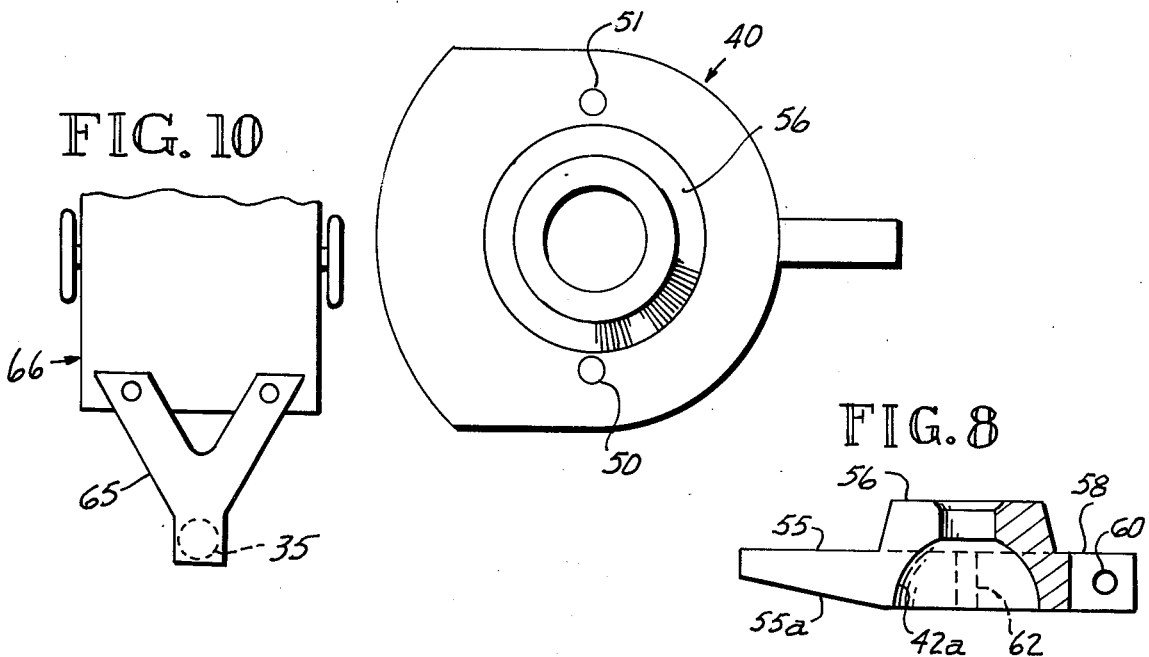
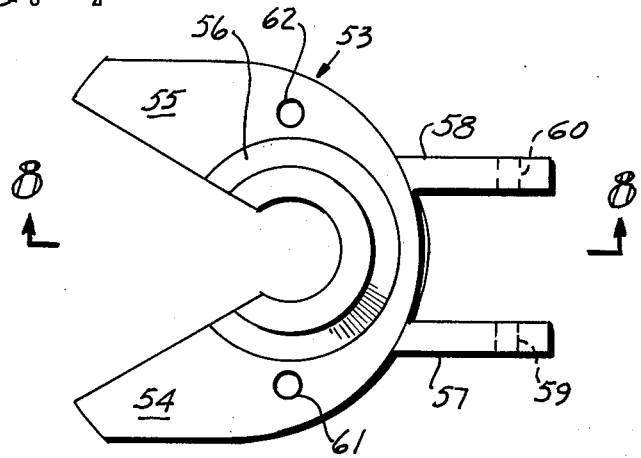
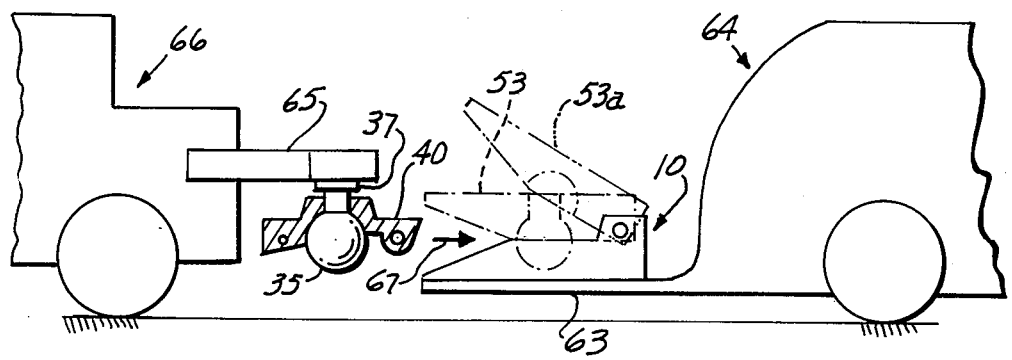

TRAILER HITCH

This invention relates to trailer hitches and has for an object to provide such a hitch which will enable a vehicle which is to be towed to be readily hitched to the towing vehicle by moving the two vehicles into towing relationship with each other.

Trailer hitches for towing vehicles are well-known. For this purpose there has commonly been mounted at the rear of the towing vehicle an upstanding ball, and at the front end of the towed vehicle, a forwardly extending tow bar. The forward end of the tow bar has contained a device such as a recess adapted to envelope and lock to the ball. The attaching of such a tow hitch has usually required some pushing or pulling of the vehicle to be towed, and lifting of the tow bar to get the tow bar into the proper position for attachment to the ball.

An object of the present invention is to provide a simple form of tow hitch by which the physical exertion attending the use of previously known tow hitches is avoided.

A related object is to enable the hitch-up to be effected backing the towing vehicle toward the towed vehicle, or running the towed vehicle to the towing vehicle.

The invention is carried out by provision of a base plate attached to one of the vehicles and a depending ball attached to the other vehicle. Either the towing vehicle or the towed vehicle may be provided with the base plate, in which case the ball will be mounted to the other vehicle. In either case the rear end of the towing vehicle will be provided with its part of the hitch device and the foward end of the towed vehicle will be provided with the complementary part of the hitch device.

The base plate is provided at its upper surface with a recess configured to receive the lower part of the ball, and for this purpose the surface of the recess will ordinarily be that of a portion of a sphere. A downwardly inclined ramp is provided from the recess to the end of the plate which is nearest to the other of the vehicles, and a cover plate for the upper part of the ball is adapted to pivot to a part of the base plate at the opposite side of the recess from the ramp.

To establish the hook-up of the two vehicles, the towing vehicle can be moved into towing relation with the towed vehicle such that in this relative movement of the vehicles the depending ball attached to the one vehicle will slide up the inclined ramp of the base plate and drop into the recess. Then the cover plate will be pivotally attached and brought down over the upper part of the ball and over at least part of the cover plate. To permit this arrangement, the under surface of the cover plate is recessed in a manner to envelop an upper part of the ball, and accordingly the recess portion of the cover plate will generally be spherical. The stem by which the ball is attached to its vehicle passes through a hole provided through the cover plate to its recess.

According to an optional feature the cover plate is hung on the upper part of the ball even when there is no hitch-up.

According to an alternative optional feature the cover plate is hinged to the base plate even when there is no hitch-up.

In accordance with this invention the attachment of the tow hitch is very much simplified and the exertion commonly required in previously known hitches is avoided.

The foregoing and other features of the invention will be better understood from the following detailed description and the accompanying drawings of which:

FIG. 1 is a top view of a base plate used in the practice of this invention;

FIG. 2 is a side view of the base plate looking from line 2—2 of FIG. 1;

FIG. 3 is another side view of the base plate looking from line 3—3 of FIG. 1;

FIG. 4 is a side view showing the base plate of FIG. 1 supporting a ball on a stem with a cover plate over the ball and base plate with the stem protruding from the cover plate, according to this invention;

FIG. 5 is a cross-section view of the arrangement of FIG. 4 taken from line 5—5 of FIG. 1;

FIG. 6 is a top view of the cover plate shown in FIGS. 4 and 5;

FIG. 7 is a top view of an alternative form of cover plate which can be used in lieu of that shown in FIG. 6;

FIG. 8 is a cross-section view taken at line 8—8 of FIG. 7;

FIG. 9 shows the attachment of a base plate to a towing vehicle and of a ball with a cover plate, to a vehicle to be towed, in accordance with this invention; and FIG. 10 shows the front end of the towed vehicle of FIG. 9, illustrating an arrangement for attaching the ball.

Referring to FIGS. 1 through 6 there is shown a base plate 10 having a circular circumference and a flat bottom 11. The top surface has flat portions 12a and 12b and a raised portion 13 in the form of a segment of a conical frustum 9. Within this conical frustum the top of the plate is shaped in the form of a spherical recess or socket 14 which starts at an upper position 16 where the upper edge of the recess meets the upper ledge 17 of the conical frustum, and the opposite rim of the recess meets a ramp 15 which slants downwardly to the opposite side of the plate at a position 18 near its bottom surface. As is best seen in FIG. 2, the surface 18 of the ramp at its lowermost height curves upwardly at 19 and 20 on either side of the lowest position 18 to meet respective ledges 21 and 22 which flare outwardly from each other toward the outer circumference of the plate and are at the same level as ledge 17 which meets them at positions 23 and 24 respectively.

A pair of spaced upstanding ridges 25 and 26 protrude upwardly from the top of the base plate integral with the base plate and with the conical frustum 9 at a position of the base plate diametrically opposite from the lowermost part of the ramp, along the center line 27 of the base plate. This center line will extend along the fore and aft direction of the vehicle to which the base plate is attached. Holes 28 and 29 extending horizontally and aligned with each other are provided through the respective ridges 25 and 26 for the purpose of inserting a pin to receive a cover as will be explained presently. Another pair of holes 30 and 31 on an aligned horizontal axis are formed through the rising sides of the ramp 15 so that another pin may be passed through them for securing the cover plate as will be presently explained. Furthermore, a pair of bolt holes 32 and 33 are formed through respective lips 34 and 35 protruding from ledge 17 at opposite sides of the ramp for the purpose of receiving respective bolts which may be used for holding down the said cover plate in addition to or alternative to pins 31 and 32. A number of holes 70 pass through the base at spaced positions around its circumference for bolting the base down onto a firm support on the vehicle.

The ball 35, best illustrated in FIG. 5, is a spherical ball from the upper side of which there extends upwardly a stem 36 provided with a horizontal flange 37. The upper section 38 of the stem is provided with threads 39 for threading into a suitable member on the one of the two vehicles which does not contain the base plate 10.

After the ball is received in the socket or recess 14 of the base plate it is covered by a cover 40, the top view of which is seen in FIG. 6. The cover has a raised central turret-like portion 41 the interior of which is formed in the shape of a spherical recess 42 of a diameter the same as that of socket 14 of the base so that recess 42 can fit down over the top of the ball after the ball is in socket 14, as shown in FIG. 5. The lower surface 43 of cover 40 is configured to conform substantially with the upper surface of base plate 10 and it includes a convex portion 44, best seen in FIG. 4, to conform substantially with the shape of the ramp 15 of the base plate. The upper central part of the turret portion 41 is provided with an opening 45 through it into the top of the recess 42 to permit passage of the stem 36, but not large enough to permit the ball to pass through it.

There is formed at the side of the cover opposite its portion 44, a lug 46 which extends downwardly to a lowermost position at 47 so that it enters between the ridges 25 and 26 of the base plate. A hole 48 through this lug is aligned with holes 28 and 29 through the ridges of the base plate so that a pin (not shown) may be passed through the holes 28, 48 and 29 and secured by suitable means such as a cotter-pin or equivalent at one end and a head formation or the like at the other end. Another horizontally extending hole 49 is passed through the portion 44 of the cover in alignment with holes 30 and 31 of the base plate so that a similar pin may be passed through all of these holes to secure the cover in position. Alternatively, or in addition, holes 50 and 51 on a vertical axis are formed through the cover plate at each side thereof in alignment with holes 32 and 33 of the base plate so that bolts 52 may be passed through the respective holes 50 and 51 and threaded into threads within holes 32 and 33.

The cover 40 will at all times be mounted on the ball as shown in FIG. 5, and to enable the cover to be put into this position the cover will be placed over the ball as shown in FIG. 5 before the flange 37 is fastened to the ball. For this purpose the flange may be internally threaded and then turned down on threads 39 of the stem until the threads bind securely to each other so that the flange cannot readily be removed.

FIGS. 7 and 8 show an alternative form of cover plate 53 which may be used in lieu of cover plate 40. The cover plate 53 is adapted to be mounted on the base plate at all times instead of over the ball at all times. For this purpose cover plate 53 is formed with two diverging sides 54 and 55 so that the ramp of the base plate is not covered by the cover plate. The cover plate is however provided with a raised turret-like portion 56 to accommodate a spherical recess 42a at its under side which is similar to the recess 42 in the cover plate 40 except that the recess is discontinued at the position of the ramp of the base plate. The cover plate 53 is provided with a pair of spaced lugs 57 and 58 extending from its opposite side from the position of the ramp of the base plate, and the lugs 57 and 58 are spaced far enough apart so that they will lie outside of members 25 and 26 of the base plate. There will also be provided holes 59 and 60 through lugs 57 and 58 to align with holes 28 and 29 of the base plate, and the pin will be placed through all these holes 59, 60, 28 and 29 so that cover plate 53 will pivot on the pin, as can be seen in FIG. 9.

To set the ball in the socket 14 of the base plate the cover plate 53 will be pivoted up off the base plate sufficient to allow the seating of the ball, after which the cover plate will be pivoted down over the base plate to cover the top of the ball. In order that the action of the ball in sliding up the ramp will raise the cover plate, the under sides of sides 54 and 55 are inclined upwardly toward the rear as shown at 55a in FIG. 8. Holes 61 and 62 through the cover plate, corresponding to holes 50 and 51 of cover plate 40 will permit the use of bolts 52 as in the case of cover plate 40.

FIG. 9 illustrates the manner of making the hitch-up. In this case the base plate 10 is mounted on a frame member 63 at the rear of the towing vehicle 64 and the ball 37 is mounted to the under side of a frame member 65 at the front end of the towed vehicle 66. This arrangement of the base plate on the towing vehicle with the ball on the towed vehicle is preferred to the reverse arrangement of the base plate on the towed vehicle and the ball on the towing vehicle, although it is possible to use either arrangement. Assuming that the towed vehicle 66 has self power, it can be moved forwardly under its own power as indicated by arrow 67, the lower end of the ball 35 being positioned so that its lower part is slightly higher than the lowermost part of ramp 15, will strike the upper surface of the ramp and ride up on it until the ball drops into the socket, after which the cover plate 40 mounted over the ball as shown in FIG. 5 will be fastened to the base plate as has previously been explained.

In the event the towed vehicle 66 is a trailer without self power the towing vehicle will have to be backed up to move in the direction opposite that shown by arrow 67 so that the same action of the ball riding up on the ramp to the socket will occur.

In the event it is desired to use a cover plate of the form of plate 53 shown in FIG. 7 instead of the cover plate 40 shown in FIG. 5, then there will not be placed any cover plate permanently over the ball 35, and instead, the cover plate 53 will be mounted on the base plate 10 as shown in phantom in FIG. 9. Then after the ball has riden up the ramp and lifted the cover plate to a position 53a also shown in phantom in FIG. 9, and then dropped into the socket, the cover plate 53 will pivot downward by its own weight over the ball and will be fastened as previously explained.

It will be understood that the embodiments of the invention illustrated and described herein are given by way of illustration and not of limitation, and that modifications or equivalents or alternatives within the scope of the invention may suggest themselves to those skilled in the art.

I claim:

1. A trailer hitch for enabling a towing vehicle to tow a towed vehicle, comprising:
    a base plate for attachment to one of the vehicles;
    a ball mounted on a stem adapted to be attached in a depending attitude to the other of said vehicles;

said base plate having at its top surface a recess shaped to receive a lower part of the depending ball and a ramp extending in a fore and aft and downwardly inclined direction from the rim of the recess to the end of the base plate nearest to said other vehicle;

said ramp having a lowest path in said fore and aft direction and having sides which extend upwardly from said lowest path;

a cover plate configured to cover at least part of the base plate and ramp;

the lower surface of said cover plate being recessed to enclose an upper part of the ball;

said cover plate having an opening communicating with its recess through which the stem may protrude;

said cover plate being suspended from the top of the ball when the ball is not engaged with the base plate, so that after the ball seats in the recess the cover plate can be fastened to the base plate;

said base plate having a ridge means at a position opposite the ramp and the cover plate having a convex portion which substantially conforms with, and covers, the ramp, and a lug portion at the opposite side of the cover plate from the convex portion for engagement with said ridge means of the base plate;

whereby when the two vehicles are moved into towing relationship with each other the ball slides up the inclined ramp between its sides and seats in the recess of the base plate after which the cover plate envelopes the upper part of the ball to hold it to the base plate.

2. A hitch according to claim 1 including means for fastening the cover plate to the base plate.

3. A trailer hitch for enabling a towing vehicle to tow a towed vehicle, comprising:

a base plate for attachment to one of the vehicles;

a ball mounted on a stem adapted to be attached in a depending attitude to the other of said vehicles;

said base plate having at its top surface a recess shaped to receive a lower part of the depending ball and a ramp extending in a fore and aft and downwardly inclined direction from the rim of the recess to the end of the base plate nearest to said other vehicle;

said ramp having a lowest path in said fore and aft direction and having sides which extend upwardly from said lowest path;

a cover plate configured to cover at least part of the base plate and ramp;

the lower surface of said cover plate being recessed to enclose an upper part of the ball;

said cover plate having an opening communicating with its recess through which the stem may protrude;

said cover plate being pivoted to a part of the base plate at the opposite side of the recess from the ramp;

said cover plate having two opposite sides which diverge from each other from said opening to its end opposite the part where it is pivoted to the base plate;

the under surfaces of said two opposite sides being inclined upwardly from said opposite end toward its recess so that when the ball slides up the ramp it pivots said opposite end upward until the ball seats, whereupon the cover plate pivots downward so that it can be fastened to the base plate;

whereby when the two vehicles are moved into towing relationship with each other the ball slides up the inclined ramp between its sides and seats in the recess of the base plate after which the cover plate envelopes the upper part of the ball to hold it to the base plate.

* * * * *